(12) United States Patent
Holbrook et al.

(10) Patent No.: US 11,487,509 B2
(45) Date of Patent: Nov. 1, 2022

(54) INTERFACE FOR BUILDING AND UPDATING PROCESSING MODULES IN A MANUFACTURING ENVIRONMENT

(71) Applicant: MASTERCONTROL, INC., Salt Lake City, UT (US)

(72) Inventors: Terrance Holbrook, Bountiful, UT (US); Chad Milito, Ogden, UT (US)

(73) Assignee: Mastercontrol, Inc., Salt Lake City, UT (US)

( * ) Notice: Subject to any disclaimer, the term of this patent is extended or adjusted under 35 U.S.C. 154(b) by 0 days.

(21) Appl. No.: 17/450,657

(22) Filed: Oct. 12, 2021

(65) Prior Publication Data

US 2022/0027144 A1 Jan. 27, 2022

Related U.S. Application Data

(63) Continuation of application No. 15/828,928, filed on Dec. 1, 2017, now Pat. No. 11,200,031.
(Continued)

(51) Int. Cl.
*G06F 8/65* (2018.01)
*G06F 8/30* (2018.01)
(Continued)

(52) U.S. Cl.
CPC .................. *G06F 8/30* (2013.01); *G06F 8/34* (2013.01); *G06F 8/65* (2013.01); *G06Q 10/06* (2013.01); *G06Q 10/063* (2013.01); *G06Q 50/04* (2013.01)

(58) Field of Classification Search
CPC .... G06F 8/30; G06F 8/34; G06F 8/65; G06Q 10/06; G06Q 10/063; G06Q 50/04; Y02P 90/30
See application file for complete search history.

(56) References Cited

U.S. PATENT DOCUMENTS 9,646,268 B1 5/2017 Workman et al.
10,088,837 B1 10/2018 Strain et al.
(Continued)

OTHER PUBLICATIONS

Final Office Action received for U.S. Appl. No. 15/828,928, dated Mar. 9, 2021, 46 pages.
(Continued)

*Primary Examiner* — Michael W Choi
(74) *Attorney, Agent, or Firm* — Workman Nydegger

(57) ABSTRACT

Embodiments are directed to providing interfaces for software updating and code building. In one embodiment, a software code building interface is provided which includes a manufacturing and production process analyzer configured to divide the manufacturing and production process into multiple physical, discrete steps. The software code building interface includes other modules that identify dependencies between the discrete steps, generate reusable, global software code elements having data structures that are implemented to dynamically create interactive interfaces that present and allow interaction with the discrete steps, and access the generated global software code elements and the identified dependencies to generate interactive manufacturing and production process interfaces. These interfaces allow users to provide information relating to the discrete steps, ensuring that the manufacturing and production process is performed in an intended manner. Other interfaces provide for the dynamic updating of software code in a manufacturing environment.

20 Claims, 17 Drawing Sheets

Related U.S. Application Data

(60) Provisional application No. 62/529,282, filed on Jul. 6, 2017.

(51) Int. Cl.
*G06Q 10/06* (2012.01)
*G06F 8/34* (2018.01)
*G06Q 50/04* (2012.01)

(56) References Cited

U.S. PATENT DOCUMENTS

| | | |
|---|---|---|
| 10,559,043 B1 | 2/2020 | Schlintl |
| 2004/0210396 A1 | 10/2004 | Fischer et al. |
| 2007/0185754 A1 | 8/2007 | Schmidt |
| 2009/0037242 A1 | 2/2009 | Ventura et al. |
| 2012/0297363 A1 | 11/2012 | Perisic et al. |
| 2018/0348728 A1 | 12/2018 | Ota et al. |
| 2019/0012151 A1 | 1/2019 | Milito et al. |
| 2020/0319767 A1 | 10/2020 | Hammack et al. |

OTHER PUBLICATIONS

Notice of Allowance received for U.S. Appl. No. 15/828,928, dated Aug. 11, 2021, 10 pages.
Non-Final Office Action received for U.S. Appl. No. 15/828,928, dated Sep. 21, 2020, 50 pages.

|  | WFI | | |
|---|---|---|---|
| MBR-4 | SH30221.03 | | Revision: 8 |
| Lot #. Demo 4 | Initiation Date. 2016-12-19 08:26 | | Quantity: |

| 3.3.1.3 - Equipment is turned on and ready for use? | | Sean Liston<br>Performed by | 2016-12-19 09:12<br>Date |
|---|---|---|---|

| 3.3.1.4 - Record 1L box set-point per hour | Notes | | |
|---|---|---|---|
| | Corrections | | |
| | Numeric Entry Correction Initiated | Sean Liston | 2016-12-19 09:14 |
| | Note added: note | Sean Liston | 2016-12-19 09:14 |
| | Value changed from "30" to "30" | Sean Liston | 2016-12-19 09:14 |
| | Correction reason provided: Entered Wrong Information | Sean Liston | 2016-12-19 09:15 |
| | Correction verified | Violet Parr | 2016-12-19 09:15 |
| | 80 bph | Sean Liston<br>Performed By | 2016-12-19 09:14<br>Date |
| Bob Parr<br>Verification | 2016-12-19 09:15<br>Date | Helen Parr<br>Witness | 2016-12-19 09:15<br>Date |

Completed By

Sean Liston     2016-12-19 09:16
Name     Date

3.3.2 Palletizing

Parallel Phases
3.3.3 Shrink Wrap Pallet

Place boxes on pallet following correct scheme in SOP-P101

| 3.3.2.1 - Record number of boxes on pallet | 42 boxes | Sean Liston<br>Performed By | 2016-12-19 09:16<br>Date |
|---|---|---|---|
| Bob Parr<br>Verification | 2016-12-19 09:16<br>Date | | |

Completed By

Sean Liston     2016-12-19 09:19
Name     Date

*FIG. 12A*

INTERFACE FOR BUILDING AND UPDATING PROCESSING MODULES IN A MANUFACTURING ENVIRONMENT

CROSS-REFERENCE TO RELATED APPLICATIONS

This application is a continuation of U.S. patent application Ser. No. 15/828,928, filed Dec. 1, 2017, and titled "INTERFACE FOR BUILDING AND UPDATING PROCESSING MODULES IN A MANUFACTURING ENVIRONMENT," which application claims priority to and the benefit of U.S. Provisional Patent Application Ser. No. 62/529,282, filed Jul. 6, 2017 and titled "INTERFACE FOR BUILDING AND UPDATING PROCESSING MODULES IN A MANUFACTURING ENVIRONMENT." All of the aforementioned applications are incorporated by reference herein in their entirety.

BACKGROUND

Manufacturing and production processes can be lengthy and complex, often involving many different steps, perhaps performed at different locations. Each of these manufacturing steps may be performed independently of the other steps, or may be dependent on the successful completion of other steps. Traditionally, manufacturing and production processes were carried out and then indicated as complete by a manager or other worker who would sign a paper stating that the task(s) had been satisfactorily performed. More modern attempts to automate this process with software have been tried, but these are typically customized, one-off solutions, which tend to fall apart when changes are made to the underlying manufacturing and production process.

BRIEF SUMMARY

Embodiments described herein are directed to providing interfaces for software updating and code building. In one embodiment, a software code building interface is provided which includes the following: a manufacturing and production process analyzer configured to analyze a specified manufacturing and production process and divide the manufacturing and production process into multiple physical, discrete steps, and a dependency identifying module configured to identify dependencies between the discrete steps in the specified manufacturing and production process.

The software building interface further includes a structure builder that generates one or more reusable, global software code elements comprising data structures that are implemented to dynamically create interactive interfaces that present and allow interaction with the discrete steps of the manufacturing and production process, and an interactive interface builder that accesses the global software code elements and the identified dependencies to generate interactive manufacturing and production process interfaces, where the interactive manufacturing and production process interfaces allow users to provide information relating to the discrete steps, ensuring that the manufacturing and production process is performed in a specified manner.

In another embodiment, a software code updating interface is provided which includes the following: a manufacturing and production process analyzer configured to analyze a specified manufacturing and production process and divide the manufacturing and production process into multiple physical, discrete steps, and a form builder that accesses one or more global software code elements and identified dependencies to generate interactive manufacturing and production process forms, where the manufacturing and production process forms allow users to provide information relating to the discrete steps, ensuring that the manufacturing and production process is performed in an intended manner.

A software code updating module is also provided that is configured to receive software code updates to specific portions of software code, identify which global software code elements are affected by the received software code updates, and propagate the received software code updates to those global software code elements that were identified as being affected by the update, so that each form built using the global software code elements is automatically updated according to the software code update.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which:

FIG. 6 illustrates a manufacturing and production process interface that includes forms for specific steps.

FIGS. 12A-12G illustrate an example of a manufacturing and production process interface that includes a plurality of process steps.

DETAILED DESCRIPTION

Figure 1:
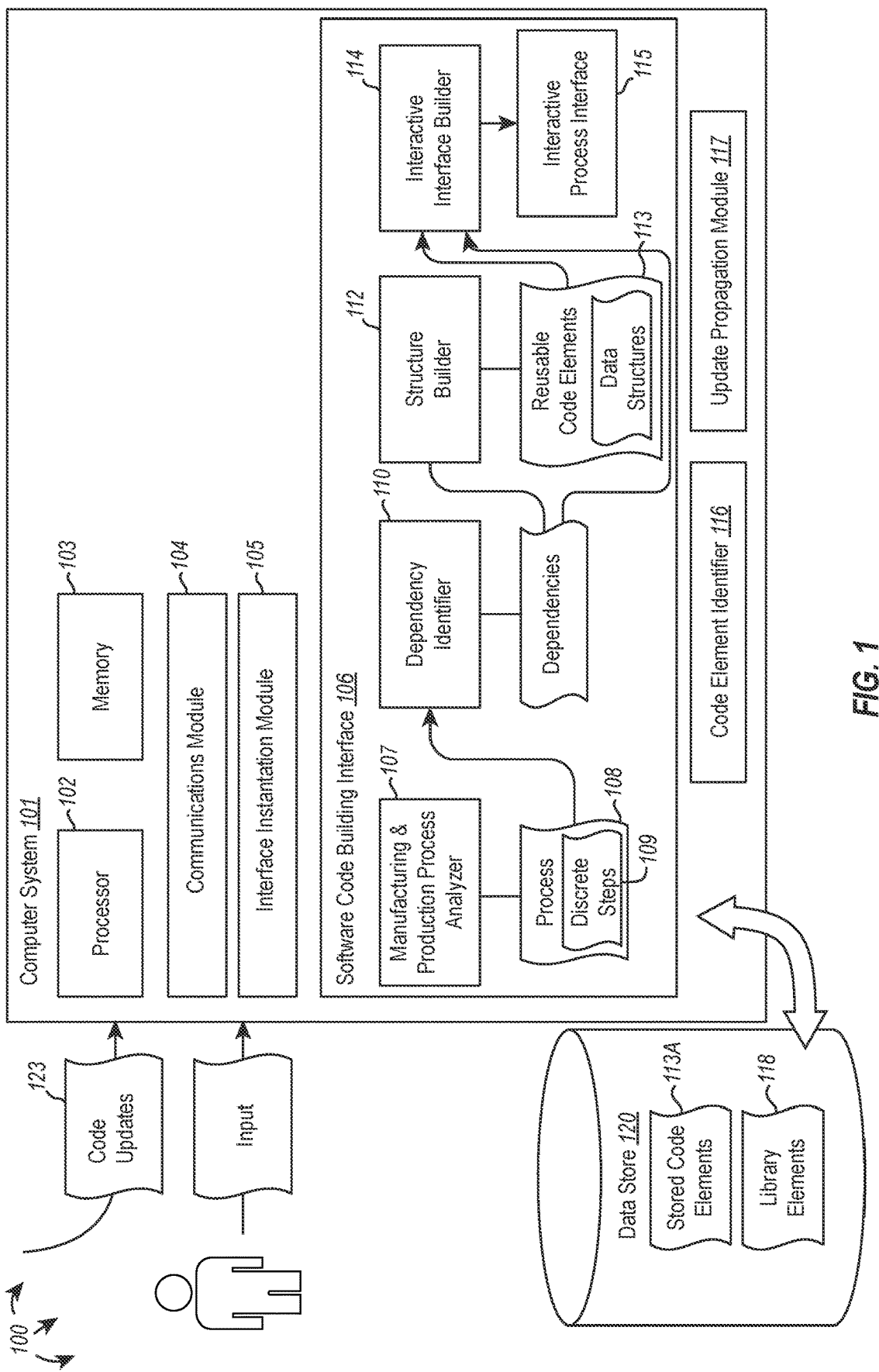
FIG. 1 illustrates a computer architecture in which embodiments described herein may operate including providing interfaces for software updating and code building.

In one embodiment, a software code building interface is provided which includes the following: a manufacturing and production process analyzer configured to analyze a specified manufacturing and production process and divide the manufacturing and production process into multiple physical, discrete steps, a dependency identifying module configured to identify dependencies between the discrete steps in the specified manufacturing and production process, a structure builder that generates one or more reusable, global software code elements comprising data structures that are implemented to create forms that present and allow interaction with the discrete steps of the manufacturing and production process, and a form builder that accesses the global software code elements and the identified dependencies to generate one or more interactive manufacturing and production process forms, where the manufacturing and production process forms allow users to provide information relating to the discrete steps, ensuring that the manufacturing and production process is performed in an intended manner.

In another embodiment, a software code updating interface is provided which includes the following: a manufacturing and production process analyzer configured to analyze a specified manufacturing and production process and divide the manufacturing and production process into multiple physical, discrete steps, a form builder that accesses one or more global software code elements and one or more identified dependencies to generate interactive manufacturing and production process forms, where the manufacturing and production process forms allow users to provide information relating to the discrete steps, ensuring that the manufacturing and production process is performed in an intended manner, and a software code updating module that is configured to: receive software code updates to specific portions of software code, identify which global software code elements are affected by the received software code updates, and propagate the received software code updates to those global software code elements that were identified as being affected by the update, so that each form built using the global software code elements is automatically updated according to the software code update.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Referring to the figures, FIG. 1 illustrates a computer architecture 100 in which at least one embodiment described herein may be employed. The computer architecture 100 includes a computer system 101. The computer system 101 includes at least one processor 102 and at least some system memory 103. The computer system 101 may be any type of local or distributed computer system, including a cloud computer system. The computer system 101 includes modules for performing a variety of different functions. The modules may be implemented (entirely or partially) in software, hardware, firmware, or some combination thereof.

The computer system 101 includes a communications module 104 that is configured to communicate with other computer systems. The communications module 104 may include any wired or wireless communication means that can receive and/or transmit data to or from other computer systems. For instance, the communications module 104 may include hardware radios including cellular radios, WiFi radios, Bluetooth radios, global positioning system (GPS) radios, or other communication means. The communications module 104 may be configured to interact with databases, mobile computing devices (such as mobile phones or tablets), embedded computer systems or other types of computer systems.

The computer system 101 also includes an interface instantiation module 105. This module is configured to instantiate interfaces including software code building interface 106. The software code building interface 106 may be used to update software and build software code. For instance, as shown in FIG. 1, the software code building interface 106 may be used to dynamically generate further interfaces that allow interaction with and control over a manufacturing and production process. The software code building interface 106 may also be used to update software code used across a given manufacturing and production process.

It should be noted that, as described herein, a manufacturing and production process may refer to any process used in manufacturing to produce an item. The manufacturing and production process typically will have multiple different steps that are taken to produce an end product (or multiple intermediate products that combine to form an end product). Each of these steps typically needs to be monitored and controlled. Current methods of writing code or updating code for such manufacturing and production processes involve writing multiple purpose-built, highly specific code modules, that each need to be maintained and separately updated. The modules are highly inefficient, as nothing is shared between modules; rather, each is a customized one-off that handles functionality for one specific manufacturing and production process.

The software code building interface 106 first includes a manufacturing and production process analyzer 107, which is configured to analyze a specified manufacturing and production process 108 and divide that manufacturing and production process into multiple physical, discrete steps 109. Some examples of these discrete steps are shown in FIGS. 4-11. Each manufacturing and production process 108 may have substantially any number of steps or sub-steps. Some of these steps must be monitored and authorized with a user's signature and timestamp. For instance, if car parts or airplane parts or other highly regulated parts are being manufactured, each step needs to be carefully controlled along the way. Successful completion is attested to by one or more workers or managers. In this manner, each discrete step 109 is tracked and accounted for in the manufacturing and production process 108.

The dependency identifier 110 receives as inputs the discrete steps 109 and identifies dependencies 111 between the discrete steps in the specified manufacturing and production process. For example, some of the discrete steps will need to be performed in a certain order. Thus, for the subsequent steps, each prior step becomes a dependency. Moreover, each step may require different type of data as inputs. This data may be a dependency. Required user inputs may be a dependency. Indeed, the dependency identifier 110 may be configured to analyze each step 109 in a manufacturing and production process 108 and identify all of its dependencies regardless of type. These dependencies 111 are then used as input for the structure builder 112 and/or the interactive interface builder 114.

The software building interface 106 further includes a structure builder 112 that generates reusable, global software code elements 113 that have data structures 119. These data structures 119 are implemented to dynamically create interactive interfaces 115 that present and allow interaction with the discrete steps 109 of the manufacturing and production process 108. The interactive interface builder 114 accesses the global software code elements 113 and the identified dependencies 111 to generate interactive manufacturing and production process interfaces 115. These interactive manufacturing and production process interfaces 115 allow users to provide information relating to the discrete steps 109, ensuring that the manufacturing and production process 108 is performed in a specified manner.

Accordingly, the software code building interface 106 provides for the construction of reusable code elements 113 which can be used to dynamically create different interfaces (e.g. 115) that allow interaction with certain parts of a manufacturing or production process. In contrast to existing interfaces, however, the generated interactive interfaces 115 are linked together via common reusable code elements. Then, when an update needs to happen, instead of each code module for each interactive process needing to be individually rewritten, changes can simply be made to the global, reusable code elements. These changes will then automatically be propagated to the interactive process interfaces 115 generated by the interface builder 114. This saves a substantial amount of computing resources that would be spent running traditional, inflexible interfaces. Moreover, additional computing resources (e.g. CPU cycles, memory, data storage) are saved by not rewriting each interface separately.

In some embodiments, different types of hardware sensors may be used. For example, hardware sensors may be placed throughout the manufacturing and production environment. The hardware sensors may be programmed to relay sensor data pertaining to the current operational state of equipment or items being produced. Furthermore, the sensor data may relate to the current location of the items or physical characteristics of the items being produced. These characteristics or locations may be measured by visible or invisible (e.g. IR or X-ray) light sensors, weight sensors, pressure sensors, temperature sensors, cameras, acoustic sensors, inertial sensors or other types of sensors. Indeed, substantially any type of hardware sensor may be used in the manufacturing and production environment.

Some sensors, such as piezoelectric sensors, may be placed at certain locations within the manufacturing and production environment, for example, to measure changes in pressure, acceleration, force, strain or temperature. These sensor measurements may be used to identify where an item being manufactured currently is (as evidenced by changes in pressure or weight at a certain point on a conveyor, for example), what trajectory that item is following, what the item currently looks like (using side-mounted or top-mounted cameras), which items are currently in production or have completed production, which workers are currently located in a given zone (e.g. using weight or infrared sensors capable of detecting body heat), or any number of other type of feedback sensor data that would be useful in determining how the manufacturing and production process is proceeding.

Moreover, hardware radios including Bluetooth radios, radio-frequency identification (RFID) radios, WiFi, Cellular, global positioning system (GPS) or other radios may be used to communicate with radios or transceivers embedded in the manufacturing equipment and/or within the items being manufactured. The radios may use signals from the embedded radios to determine current location, current trajectory, current contents, or other information about the equipment being manufactured. These hardware radios may also be in communication with mobile electronic devices used by workers or used at workstations within the manufacturing and production environment. Internet of Things (IOT) devices may communicate using such radios, and may be programmed to communicate information about the manufacturing equipment and manufactured items to a central server and/or the computer system 101. The IOT devices may also communicate directly with the various hardware sensors. Thus, the computer system 101 may receive a variety of inputs from hardware devices, sensors and radios to monitor and control manufacturing and production processes.

Figure 2:
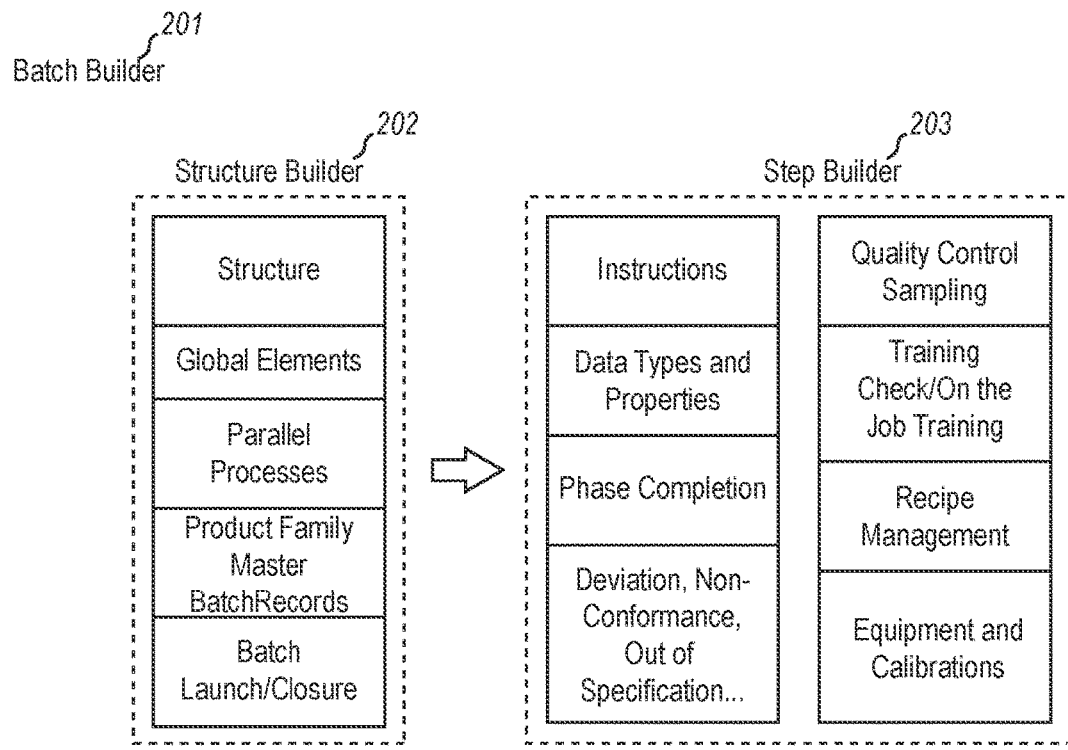
FIG. 2 illustrates an embodiment of a batch builder and a step builder for implementation with a manufacturing and production process.

As generally shown in FIG. 2, a software code building interface may be provided. The software code building interface may be the same as or different than interface 106 of FIG. 1. The interface of FIG. 2 (i.e. batch builder 201) may be configured to assist in the creation of batches. Each manufacturing and production process may have one or more batches. Each batch may be comprised of various structural components and various steps. The interface 201 may thus include a structure builder 202 which provides global software code elements, parallel processes, product family master batch records, and batch launch or closure functionalities. The interface 201 may also include a step builder 203 that provides instructions, data types and properties, section completion, and deviation or non-compliance forms, along with quality control sampling, on-the-job training, recipe management and equipment information and calibration data. The structural pieces part of builder 202 are used in combination with the steps in the step builder 203 to create an interactive interface that allows users to interact with the various steps.

Figure 3:
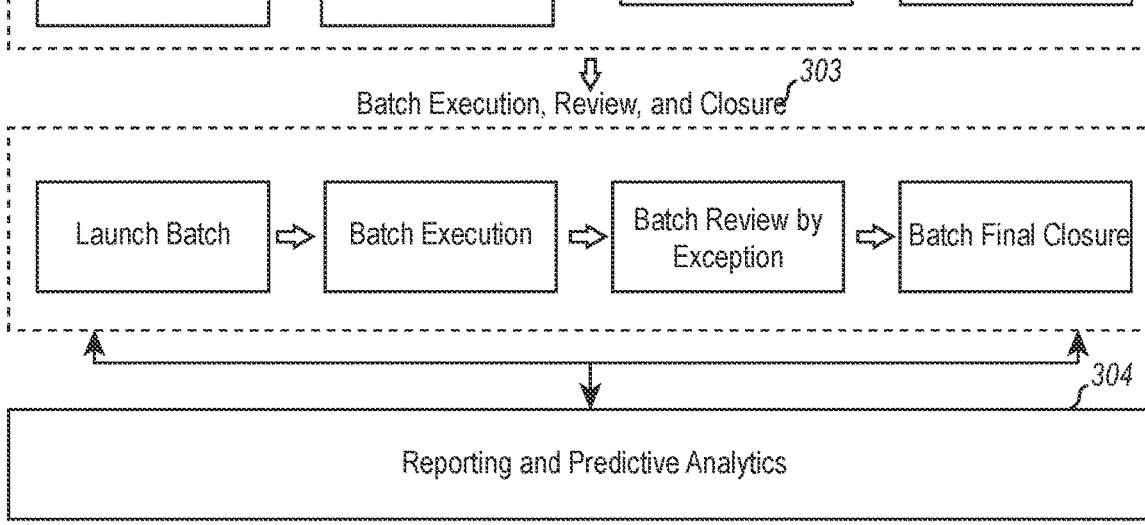
FIG. 3 illustrates an embodiment of a manufacturing batch record, including batch record review and approval steps.
Figure 4:
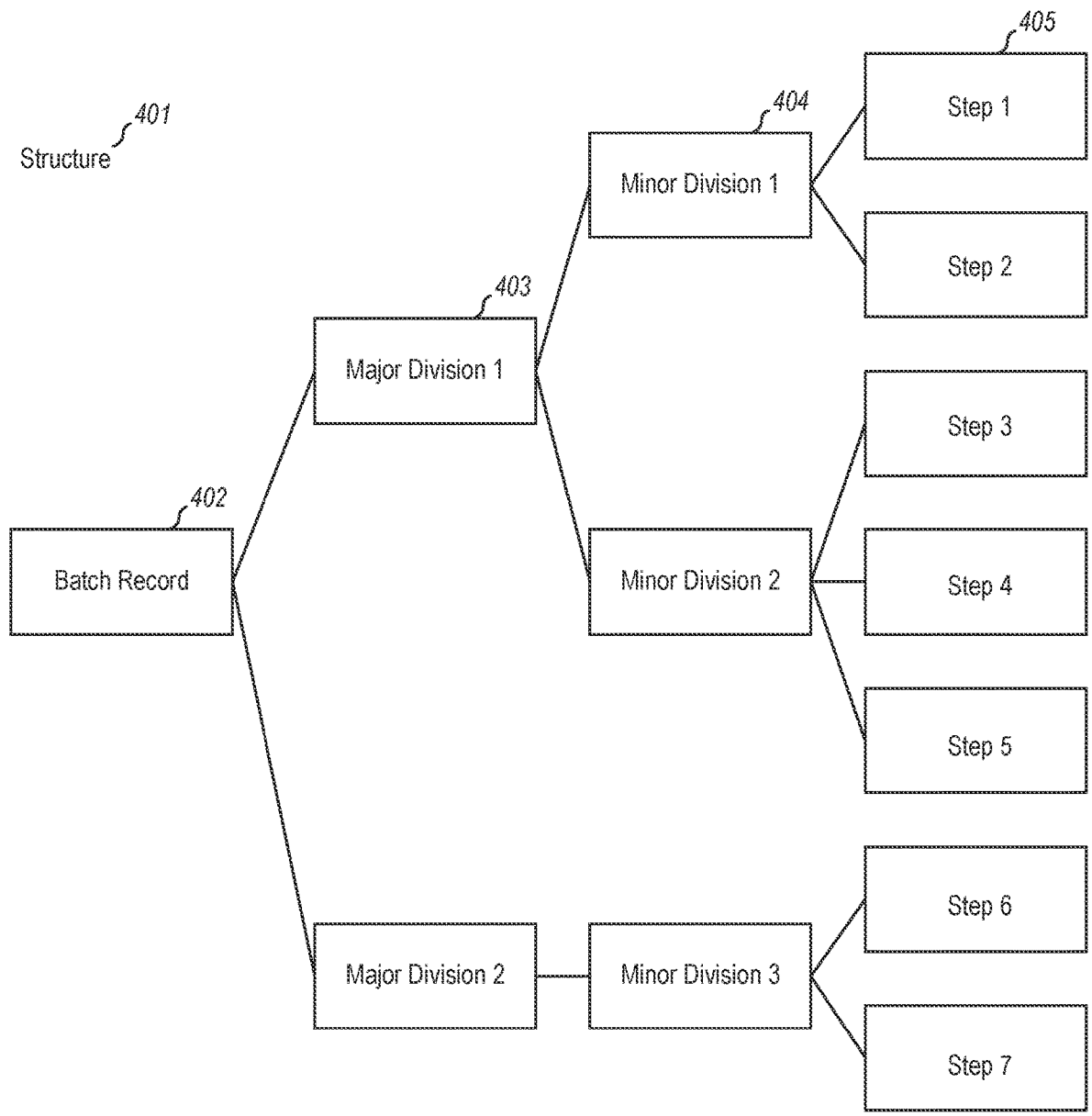
FIG. 4 illustrates an embodiment of a manufacturing batch record, including major divisions, minor divisions, and discrete steps.
Figure 5:
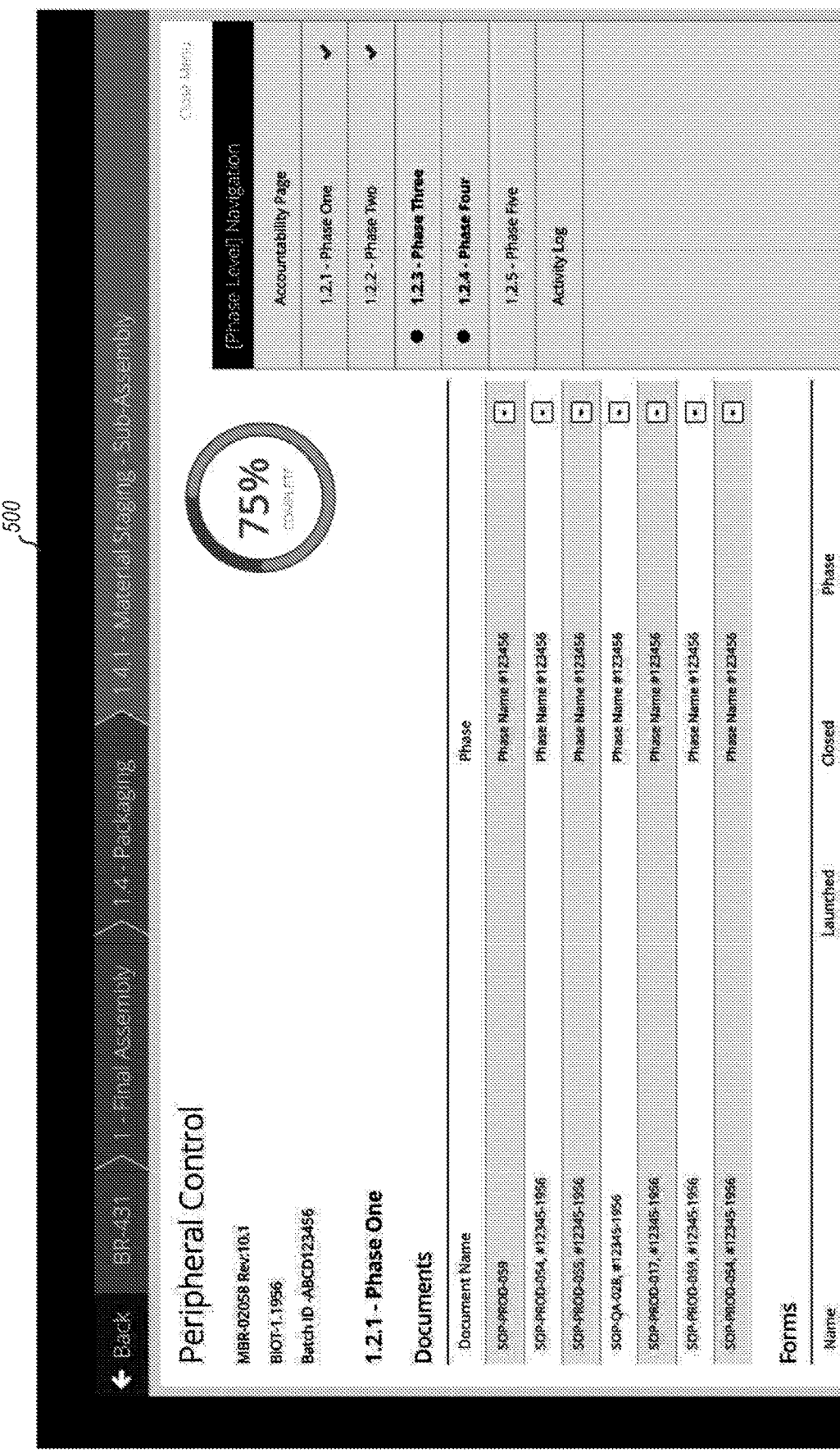
FIG. 5 illustrates a manufacturing and production process interface that includes documents for specific steps.

In one embodiment, a computer program product is provided on a computer storage media having stored thereon computer-executable instructions which, when executed by one or more processors of a computing system, cause the computing system to instantiate a software code building interface. The software code building interface (e.g. 106 of FIG. 1) includes a manufacturing and production process analyzer 107 configured to analyze a specified manufacturing and production process 108 and divide the manufacturing and production process into a plurality of physical, discrete steps 109. At least some of these steps are shown in FIG. 3, for example. For each manufacturing batch record 301, a master batch record process undergoes configuration and approval (at 302). The batch record 301 then moves to batch execution, review and closer (at 303). Upon completion, reporting and predictive analytics are performed (at 304).

The manufacturing batch record 301 may be broken into major divisions, which are then broken into minor divisions. For instance, in FIG. 4, the batch record 402 of structure 401 is divided into major divisions (403) and minor divisions (404). Each minor division 404 has one or more corresponding steps 405 which are to be performed as part of the manufacturing and production process. One skilled in the art will recognize that a given batch record may be broken into substantially any number of major or minor divisions, or steps. Each of these steps may be independent or related to or dependent on completion of other steps. In this manner, complex and lengthy manufacturing processes are divided into multiple smaller areas and steps. These divisions allow each part of the process to be individually tracked and verified.

Accordingly, the software code building interface 106 of FIG. 1 divides large processes into smaller, discrete steps 109. The software code building interface 106 also includes a dependency identifier 110 that identifies dependencies between the discrete steps 109 in the specified manufacturing and production process 108. The dependencies may be identified by analyzing inputs to a given step, or by accessing a list of dependencies provided by a user (e.g. in input 122 provided by user 121). The structure builder 202 of FIG. 2 generates reusable, global software code elements that include data structures that are implemented to create interactive interfaces including forms that present and allow interaction with the discrete steps of the manufacturing and production process. The forms (which will be described further below with regard to FIGS. 12A-12G) allow users to see each step, and provide information relating to that step such as which portions of the step have been started or completed, and who completed them. The forms may allow users to provide pictures, videos or other media showing the status of the step, or identifying the person(s) who did work related to the step.

An interactive interface builder 114 (or, in some embodiments herein, a "form builder") is also part of the software code building interface 106. The form builder accesses the global software code elements and any identified dependencies to generate interactive manufacturing and production process forms. These manufacturing and production process forms allow users to provide information relating to each discrete step in the process, ensuring that the manufacturing and production process is performed in an intended manner. The physical, discrete steps of the manufacturing and production process may include unit procedures indicating which steps (or parts of steps) are to be performed by facility, by person, by room, etc. The steps may also include operations data and sections where operators (e.g. 121) will interact with the forms. The operations data and sections may include information fields, pictures, video, audio or other data related to a given step.

Often, in the manufacturing and production process, methods of manufacturing will change, and any forms or interfaces associated with that process will need to be updated. In past scenarios, where manufacturing and production processes were coded in one-off, custom software solutions, updates to any part of the manufacturing process might affect a multitude of different forms, each of which would have to be individually analyzed (to determine if an update was necessary) and then individually updated. In the embodiments herein, global software code elements (113 of FIG. 1) are implemented which automatically propagate any changes into the associated forms or interfaces. Thus, the manufacturing and production process forms can be automatically updated dynamically in real-time.

In some cases, the global software code elements 113 may include library elements (118) that provide features that are reusable in different forms for the manufacturing and production process. Thus, if a given form implements a certain feature, and that feature is coded into a global software code element, the global software code element can be instantiated to provide that feature in the form or interface. If a library element is updated, it may be marked and other software code elements that use that library element will use the updated version. This is much more efficient than previous implementations where data would be listed in spreadsheets, and then copied from the spreadsheets to the form. Moreover, the global software code elements are modular, independent units that are reusable in any number of forms for different manufacturing and production processes. The library elements 118, along with other global code elements 113A, may be stored in a local or remote data store 120.

Information relating to the discrete steps 109 of the manufacturing process 108 may be provided by users (e.g. 121). The information may signify completion of one or more of the discrete steps, or may signify failure or partial progress of the step. The forms (as generally shown in FIGS. 5-11) show the progress of each step, and may further show that step's dependencies 111. For instance, steps that have dependencies or parallel processes may be marked in such a way as to stand out to a user. In the past, a batch record would be split into multiple physical forms and would then be taken to different parts of the manufacturing floor, risking the chance of the pieces later being put back together wrong. In the embodiments herein, parallel processes are marked and are tracked so that no step is left overlooked or performed improperly.

Common properties may be implemented across modules, data types, and forms within the system. This allows change control in the manufacturing and production process, as each module, data type and form uses common properties that allow tracking of who made changes, what changes were made and when the changes were made. The change control information may be stored in a local or remote database (e.g. in data store 120). The properties may, for example, identify which groups, supervisors, and/or products are to be used or are in use for the manufacturing and production process. Each manufacturing and production process form may have a field for data reviews that provides a means for inputting FDA-compliant signatures. In this manner, workers may input their process reviews and sign off on tasks in a manner that satisfies regulatory compliance standards.

Various methods may be provided that implement the software code building interface 106. For instance, a user may instantiate a code building interface to generate forms for certain processes, and then implement those processes using the input from the forms. Later, the software updating interface (described below) may be used to update software code for the manufacturing and production process.

The software code updating interface may include a manufacturing and production process analyzer (e.g. 107) that analyzes a given manufacturing and production process 108 and divides the manufacturing and production process into multiple physical, discrete steps 109. The software code updating module may also include a form builder that accesses global software code elements and identified dependencies to generate interactive manufacturing and production process forms. The manufacturing and production process forms allow users to provide information (122) relating to the discrete steps, ensuring that the manufacturing and production process is performed in an intended manner.

The software code updating interface further includes a software code updating module that is configured to receive software code updates 123 to specific portions of software code, and then identify which global software code elements are affected by the received software code updates. The code element identifier 116 may identify those global software code elements that were affected by the code update. The update propagation module 117 may then propagate the received software code updates to those global software code elements that were identified as being affected by the update. In this manner, each form built using the global software code elements is automatically updated according to the software code update 123. The affected code elements are dynamically and automatically updated, such that even forms in use may be re-instantiated to include the updates specified in the updated global software code elements. Affected code modules may be identified using the determined dependencies 111.

The form builder may be configured to pull in images, videos, or other media for instructions regarding the manufacturing and production process. This image or video content may be taken with the worker's smart phones or other cameras or mobile devices that have embedded cameras. Indeed, the manufacturing and production process forms may include an input for camera data showing images of what was done and who witnessed the task. The manufacturing and production process forms may also include out-of-specification forms or non-conformance forms which allow a worker to input information indicating that a given step has been performed in a non-conforming manner, or has been performed outside of specifications. Each step may have a specified numeric field with specified ranges or tolerance levels for input values. If those input values exceed or fall short of the range specified, the task is said to be non-conforming, and a variation on the form (or a different, non-conforming form) may be provided.

The manufacturing and production process forms may allow workers to input data on quality control sampling, indicating the result of quality checks, or even pictures of quality control samples. The manufacturing and production process forms may also provide training checks or on-the-job training. Each form may have embedded images, video, or links thereto that allow a worker to learn the task and even certify on the task using a skills check or test to verify their knowledge. Each manufacturing and production process form may include an interface with an enterprise resource planning (ERP) module to present a bill of materials, and an indication of quantities consumed. In this manner, a manager or worker can be apprised of up-to-the-minute information regarding resources consumed and resources available for consumption.

The form builder or interactive interface builder 114 of the software code updating interface 106 may be configured to generate a batch record template and provide the batch record template to a documents module that has revision control. The documents module may track any changes that are made to the batch record template. For instance, as shown in interface 500 of FIG. 5, a user may be able to view various documents that pertain to a given step (in this case, step 1.4.1 "Material Staging—Sub-Assembly"). The interface 500 may also allow users to make changes to the documents as desired. In some cases, the form builder allows multiple users to use the same form simultaneously, and the documents module may track each user's changes to the form simultaneously. The form builder provides change control on both the form level and the user level to track who made changes to the forms and when. The changes may be controlled via a rights-based policy, role-based policy or some other policy. Each batch record may be kept open until each step's form (or non-compliance form) has been filled out and completed and signed by the requisite managers or workers.

Throughout the manufacturing and production process, any steps or sections in the manufacturing and production process that are capable of parallel implementation allow multiple users to work on the sections simultaneously. This parallel implementation thus allows users in different groups (potentially located in different buildings) to make changes simultaneously. The form builder also allows users to create a quality control table or a manufacturing table data collection to track how each step in a batch is being performed. The manufacturing and production process forms allow task scheduling, and further indicate, based on average times for each batch record, whether a given task is behind or ahead of schedule. The form builder may also generate an industry-acceptable batch record and provides that batch record to one or more users. In prior implementations, when a customer asked for a batch record, the customer would get a list of data that the system collected that would have to later be manually compiled into an acceptable batch record. The embodiments herein can generate an industry-acceptable batch record that could be provided directly to an auditor or to a government entity.

Figure 6:
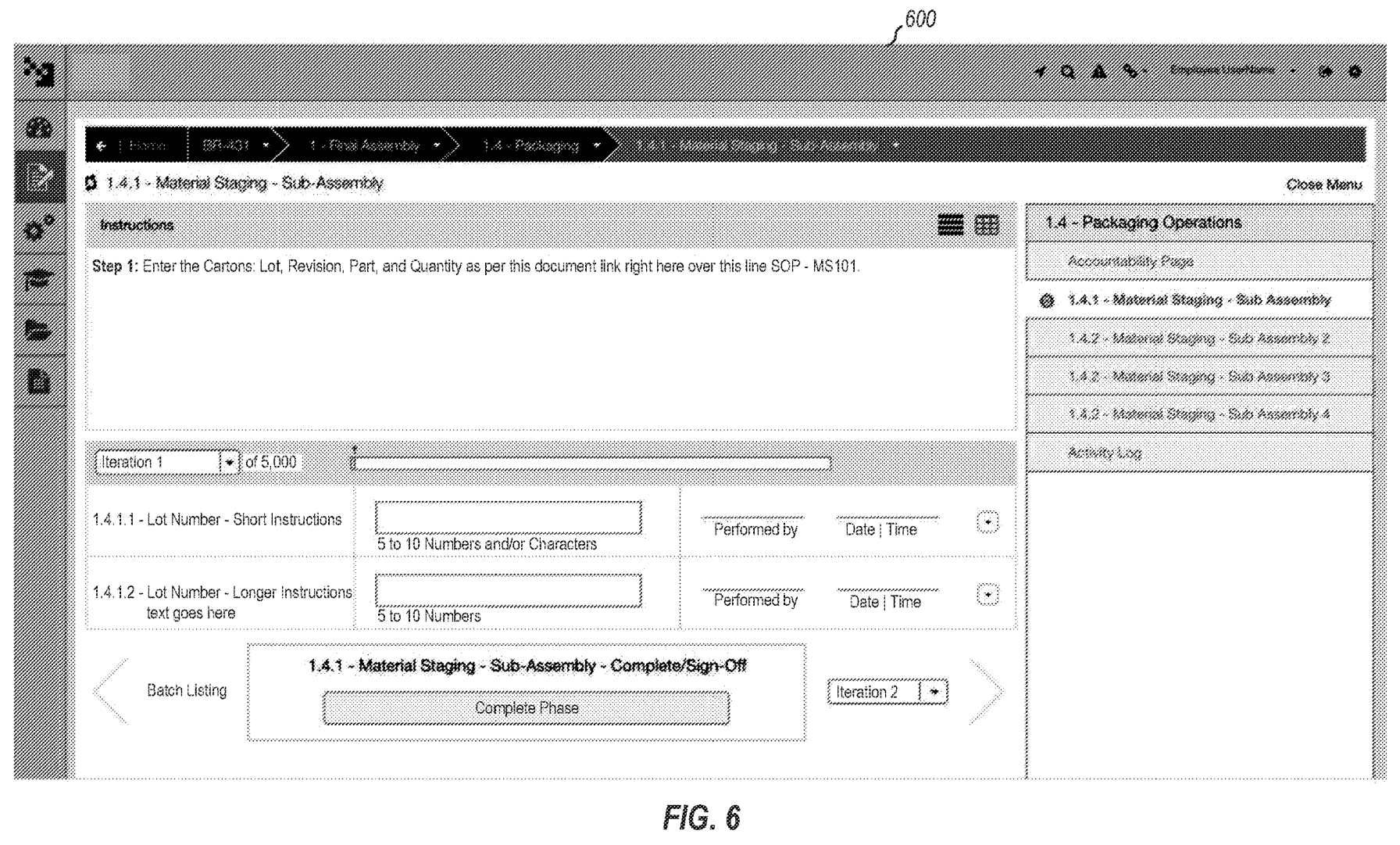

FIG. 6 illustrates an embodiment of an interface 600 that allows users to provide information regarding a given section or step of a manufacturing and production process. For instance, in interface 600, a user may provide instructions regarding a given iteration of a section, including what is to be performed and who is to perform it. A Batch Listing may indicate the name of the step (here, it is "1.4.1—Material Staging—Sub-Assembly—Complete/Sign-Off"), under the heading of "1.4—Packaging Operations." Various interface menu options and buttons allow the user to navigate the different information fields that are available.

Figure 7:
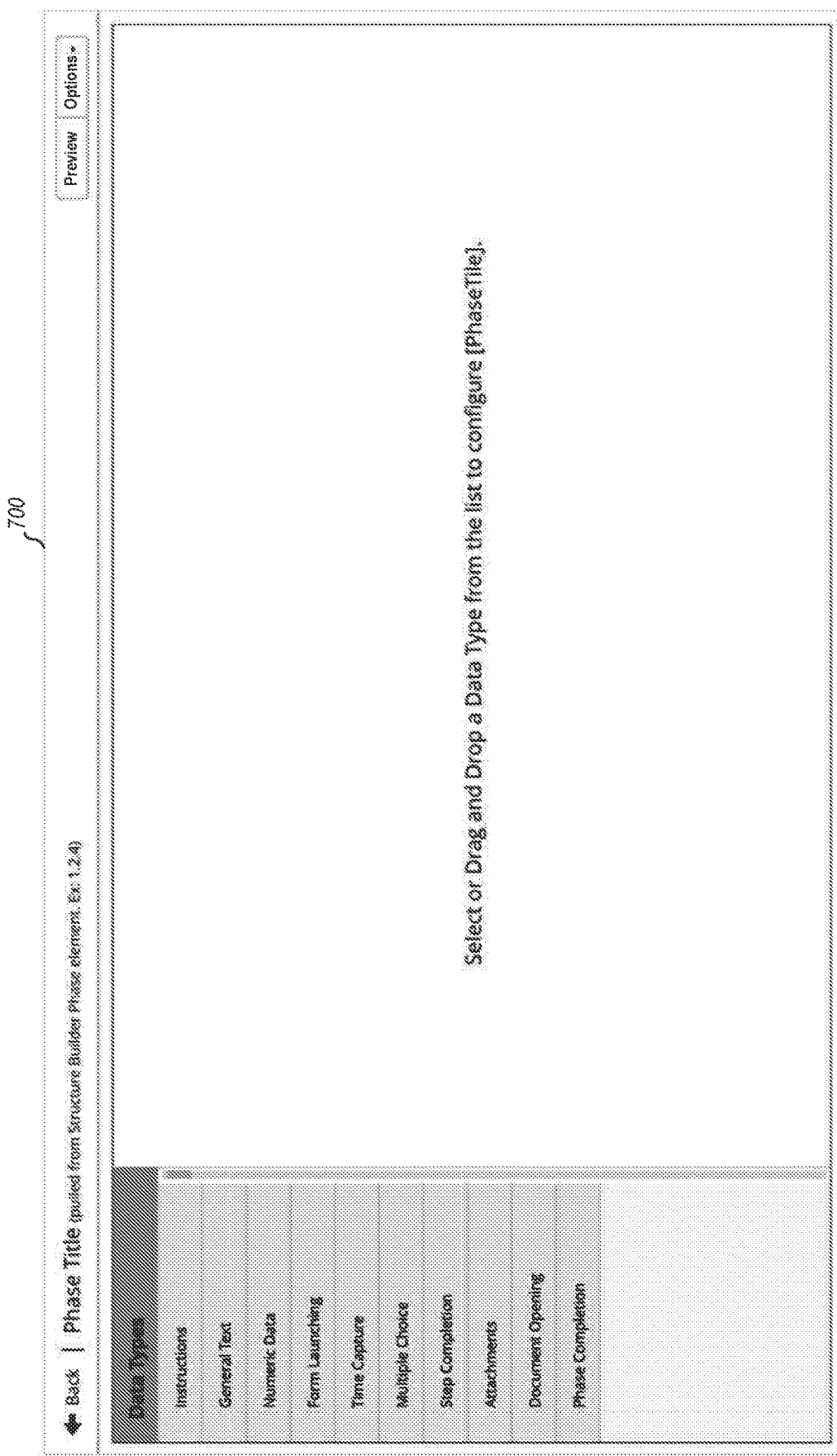
FIG. 7 illustrates a manufacturing and production process interface that allows selection of data types to configure process steps.

FIG. 7 illustrates an interface 700 that allows users to drag and drop data types to configure different sections. For example, a user can drag and drop an "Instructions" data type that allows the user to then provide instructions for performing a given section. Similarly, a user may drag and drop other data types that provide different functionality including form launching, step completion, document opening, section completion or providing general text or numeric data. Other data types and data structures may also be provided. Using such an interface, a user may create substantially any type of form or interface that may be used in a manufacturing and production process.

For instance, some manufacturing and production process forms include out-of-specification forms or non-conformance forms. Users may use interfaces, such as 600 of FIG. 6, or 700 of FIG. 7 to generate or interact with out-of-specification or non-conformance forms. These out-of-specification and non-conformance forms may be generated dynamically for each section, and may be generated using the global reusable code elements 113 of FIG. 1. The data structures 119 of FIG. 1 may be the same as or different than those shown in interface 700 of FIG. 7. In some cases, a given batch record may be kept open until each non-compliance or out-of-specification form has been filled out and completed. In this manner, progress on and processing of a given batch may be closely monitored and controlled.

Figure 8:
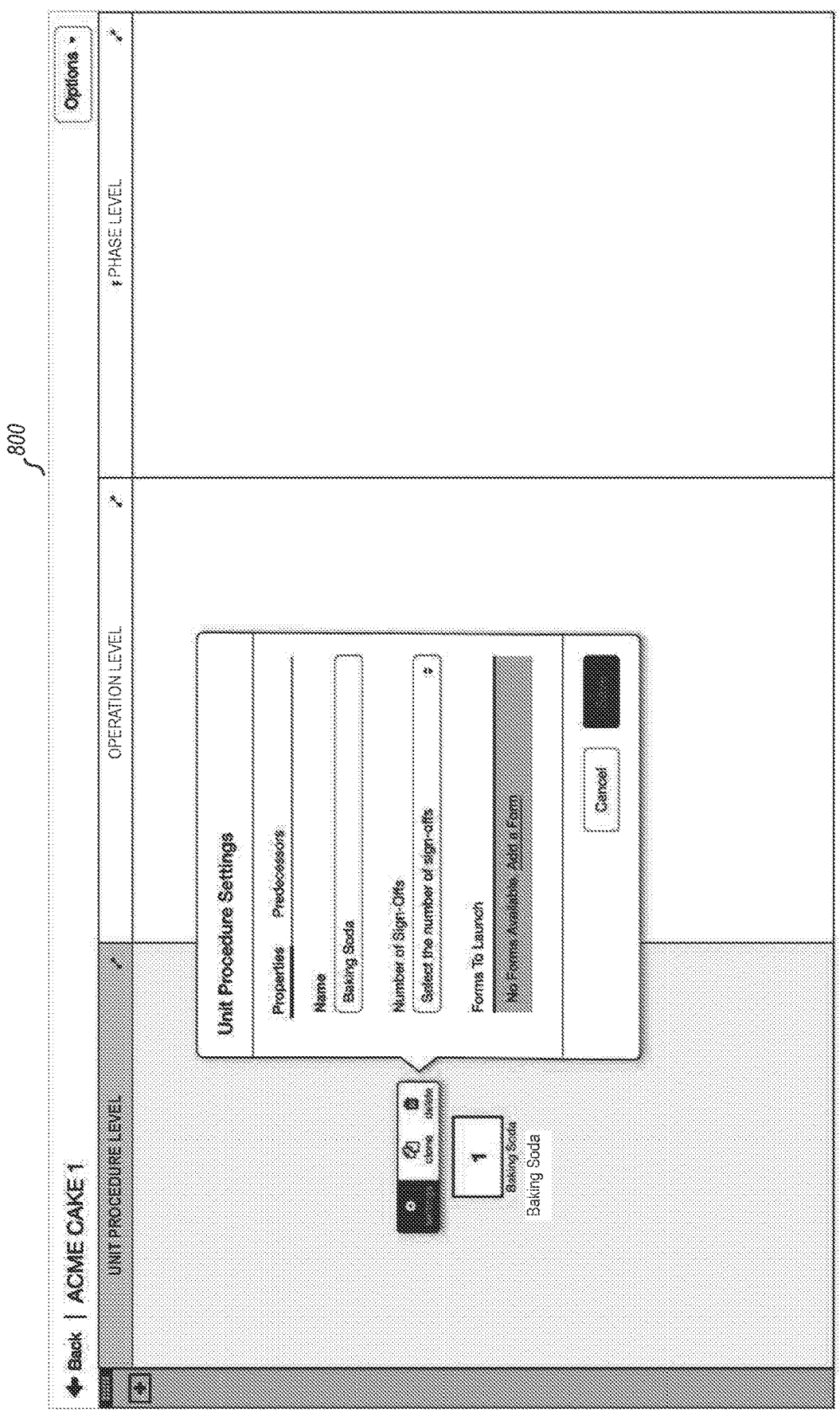
FIG. 8 illustrates a manufacturing and production process interface that allows changes to unit procedures.
Figure 9:
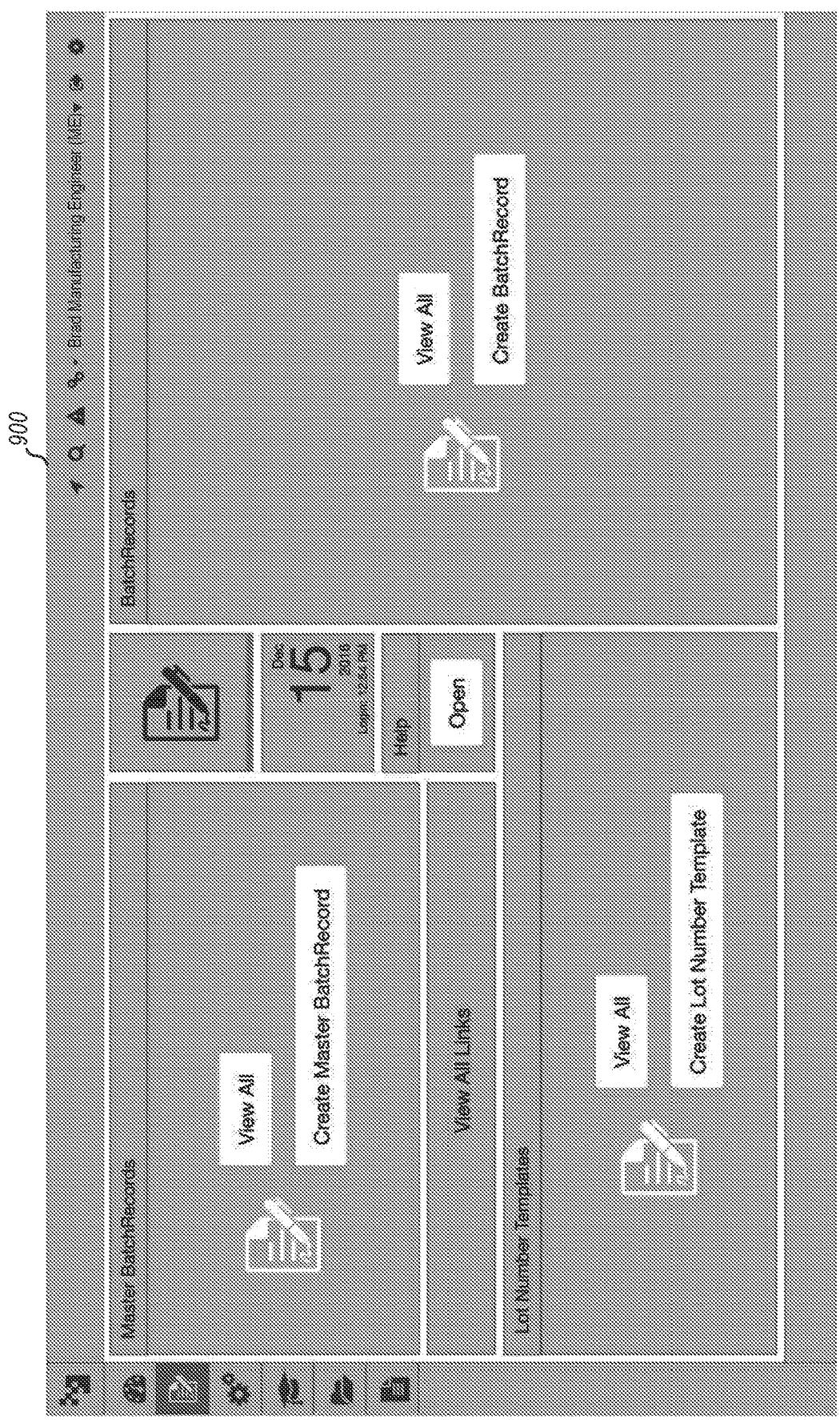
FIG. 9 illustrates a manufacturing and production process interface that allows changes to master batch records.
Figure 10:
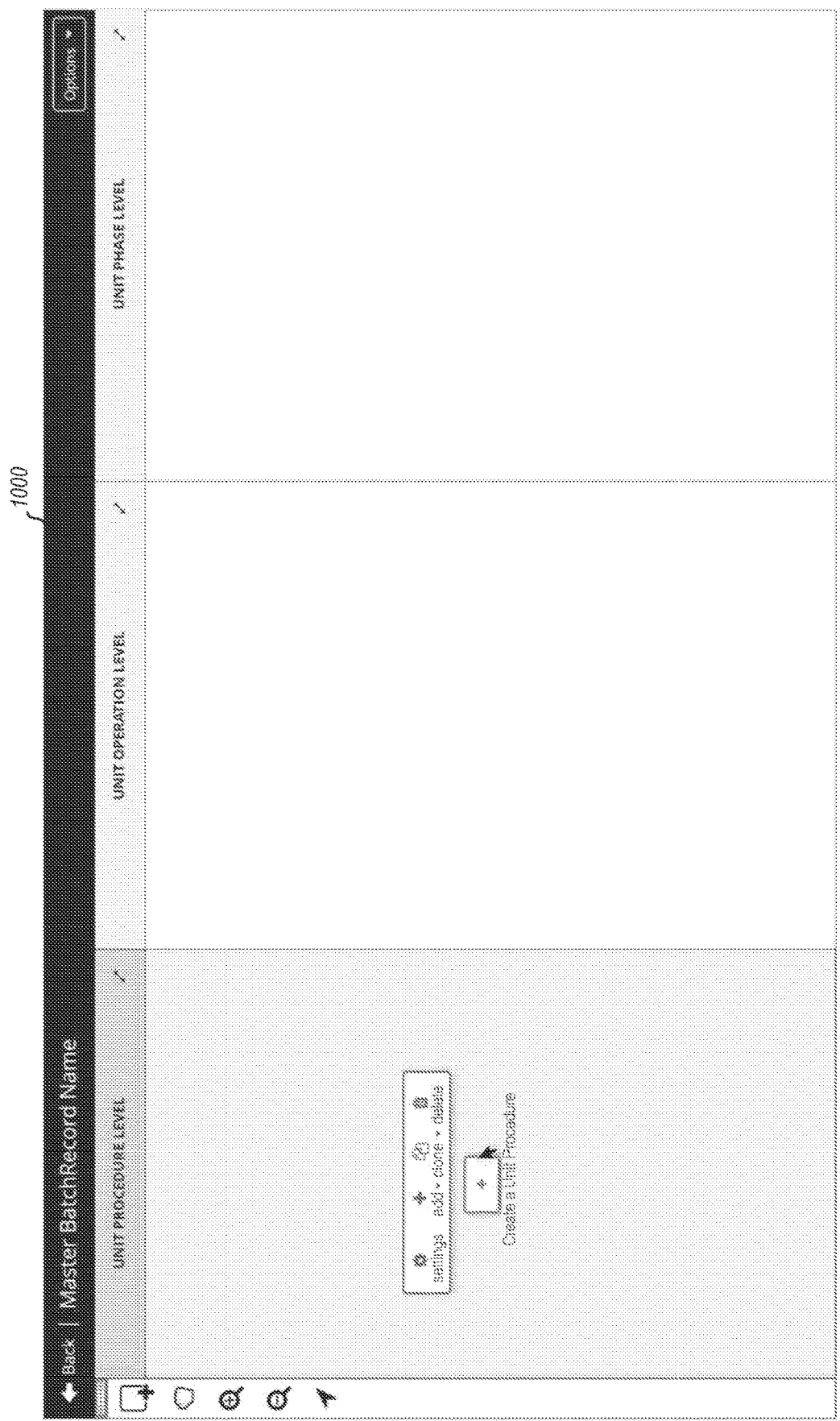
FIG. 10 illustrates a manufacturing and production process interface that allows further changes to unit procedures within master batch records.
Figure 11:
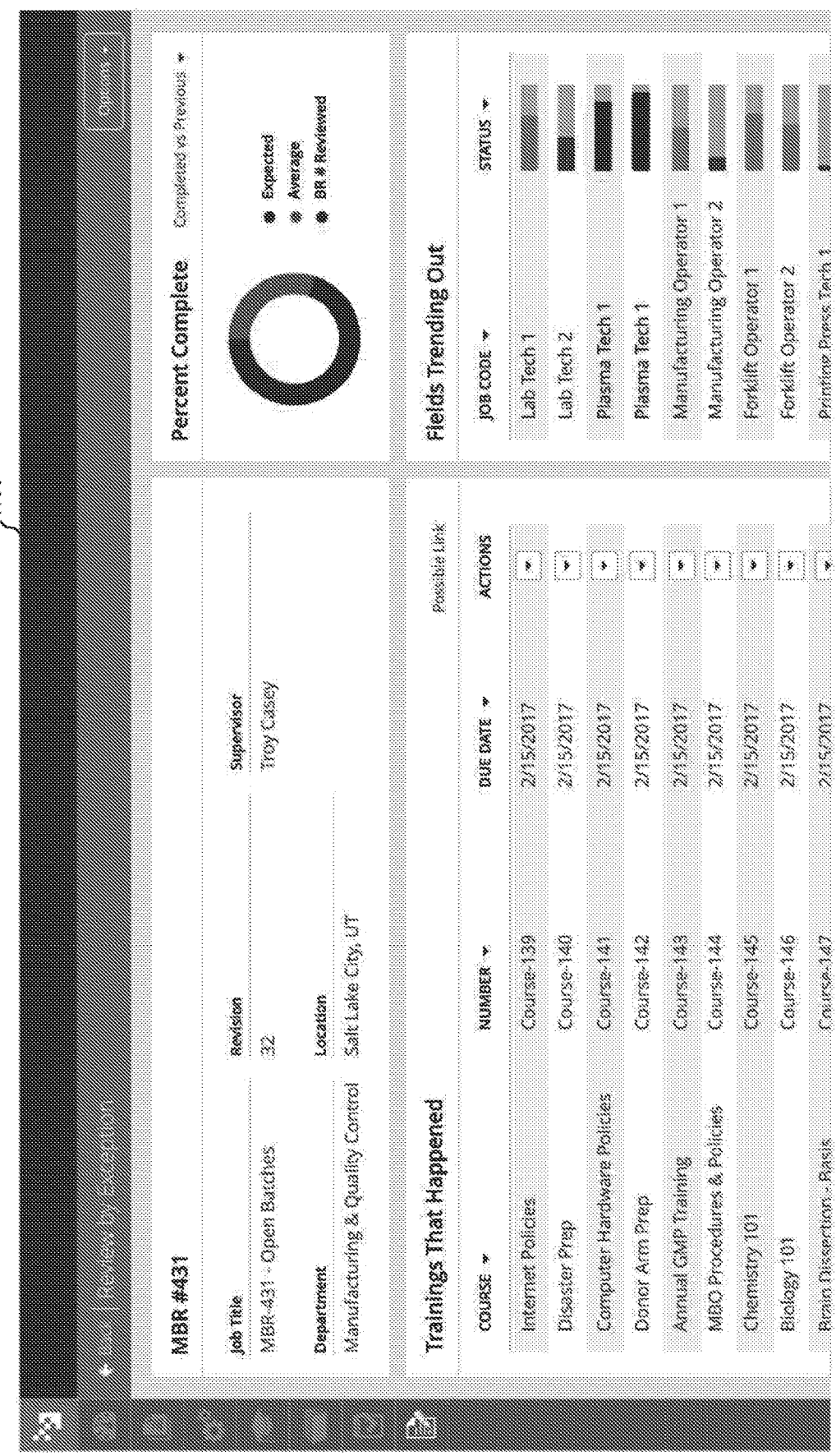
FIG. 11 illustrates a manufacturing and production process interface that allows users to view process exceptions.
Figure 12B:
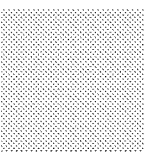
Figure 12C:
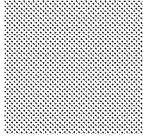
Figure 12D:
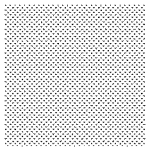
Figure 12E:
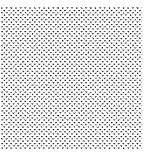
Figure 12F:
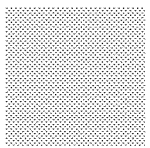
Figure 12G:
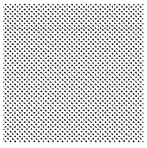
Figure 13:
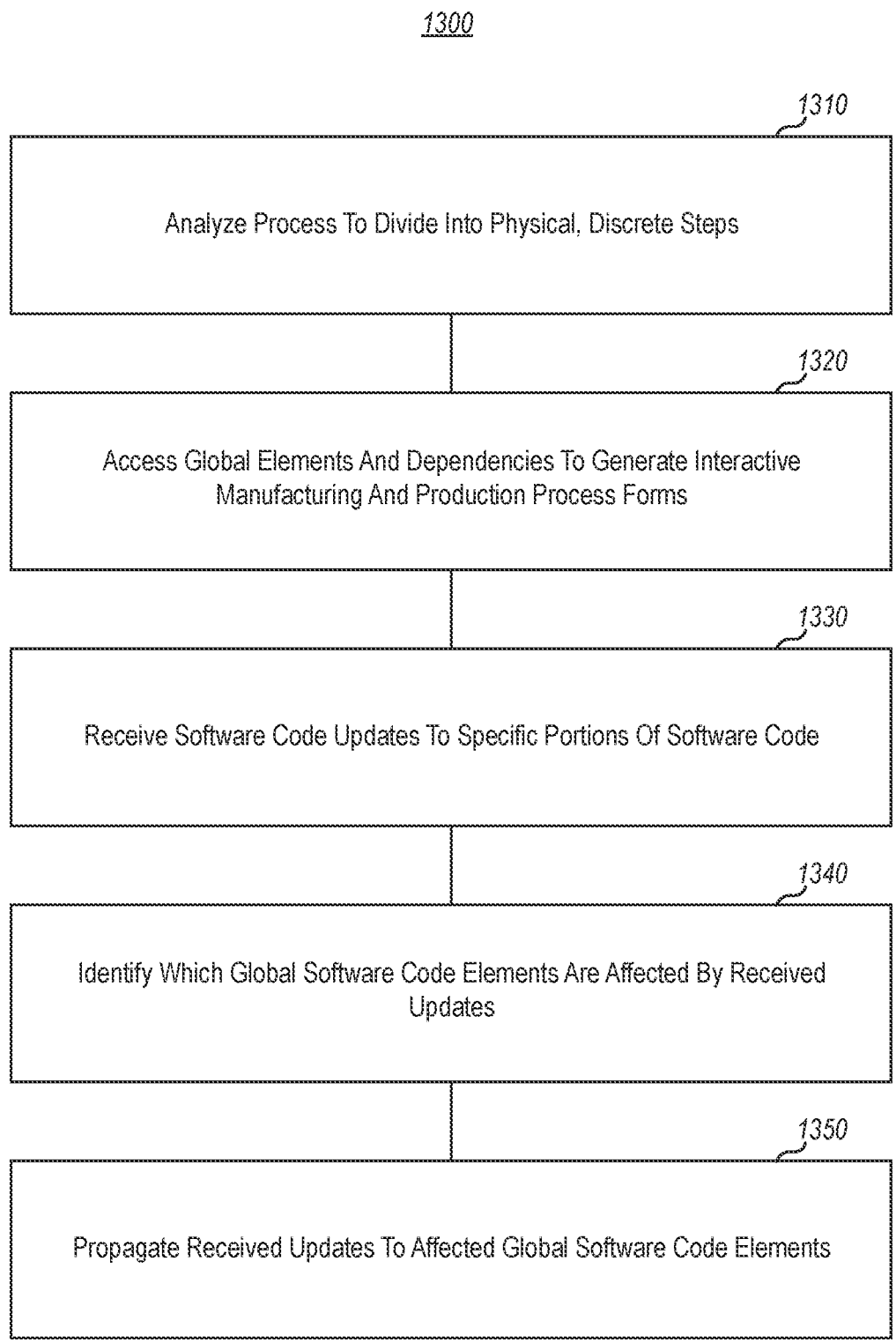
FIG. 13 illustrates a flowchart of an example method for providing interfaces for software updating and code building.

FIG. 8 illustrates an embodiment of an interface 800 that allows users to access unit procedure settings including properties, dependencies (i.e. predecessors) signoffs, forms to launch, etc. These unit procedure settings may be provided at various levels including the unit procedure level, the operations level and/or the section. As shown in interface 900 of FIG. 9, a user may view and/or create master batch records or traditional batch records. When viewing a given batch record, the user may change settings, add or remove steps, change unit procedures, duplicate the batch record or delete the batch record, as shown in interface 1000 of FIG. 10. Viewing a given master batch record shows open batches, which department is processing the batches, where the department is located, who the supervisor is, which actions were performed (e.g. which trainings were performed, as shown in interface 1100 of FIG. 11), a total completion percentage and a status indicator for various workers or departments.

As can be seen from the various example interfaces in FIGS. 5-11, a manager or other user may have full control over each part of a manufacturing and production process. Moreover, the manager or user may be able to make changes to a given record that are propagated one or more other records without the user having to rewrite custom, on-off code written specifically for a given batch. At least some of the forms and interfaces described herein allow multiple users to work on a given batch or section simultaneously. Indeed, any sections in a given manufacturing and production process that are capable of parallel may allow multiple users to work on the sections simultaneously. The forms and interfaces also allow task scheduling, and may be configured to indicate, based on average times for batch records, whether a given task is behind or ahead of schedule. This keeps the manager or user apprised of current progress across the process.

Still further, the manufacturing and production process forms may allow quality control sampling, allowing users to input data regarding the results of quality control samples taken during manufacturing. Forms and interfaces may also provide training checks or on-the-job training, including videos, presentations, documents or other information that is used to train employees on-the-job. Tests can also be provided to ensure that the training was effective. The form builder may further allow a user to create a quality control table or a manufacturing table data collection. Such tables allow the user to track production quality over time for different workers, different groups, different tasks or different manufacturing areas. The form builder may also be configured to generate industry-acceptable batch records and provide those records to specified users.

Accordingly, methods, systems and computer program products are provided which instantiate a software code building interface. Moreover, methods, systems and computer program products are provided which instantiate a software code updating interface. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer-implemented method executed on one or more processors, the computer-implemented method for instantiating a software code building interface, the computer-implemented method comprising:
   generating one or more reusable global software code elements comprising data structures that are implemented to dynamically create interactive interfaces that present and allow interaction with discrete steps of a manufacturing and production process;
   generating multiple interactive manufacturing and production process interfaces, the multiple interactive manufacturing and production process interfaces indicating, based upon average times for batch records, whether a given task is behind or ahead of schedule; and
   after receiving software code updates, identifying the one or more reusable global software code elements that are affected by the software code updates, wherein:
      the one or more reusable global software code elements are implemented within the multiple interactive manufacturing and production process interfaces, and
      after the one or more reusable global software code elements that need to be updated are identified, the identified one or more reusable global software code elements are automatically updated, such that the multiple interactive manufacturing and production process interfaces are also automatically updated.

2. The computer-implemented method of claim 1, wherein the discrete steps of the manufacturing and production process include unit procedures, operations, and sections in which operators interact with the interactive interfaces.

3. The computer-implemented method of claim 1, wherein the one or more reusable global software code elements comprise library elements that provide features that are reusable in different interactive interfaces.

4. The computer-implemented method of claim 3, further comprising:
   determining that at least one of the library elements has been updated; and
   marking at least one updated library element with an identifying mark, such that other software code elements that use the at least one of the library elements will use the at least one updated library element.

5. The computer-implemented method of claim 1, wherein interactive interfaces that have dependencies or parallel processes are marked in a specified manner.

6. The computer-implemented method of claim 1, wherein the one or more reusable global software code elements are modular, independent units that are reusable in a plurality of interactive interfaces for different manufacturing and production processes.

7. The computer-implemented method of claim 6, wherein properties are implemented across modules, data types, and forms, allowing change control in the manufacturing and production process.

8. The computer-implemented method of claim 7, wherein the properties identify which groups, supervisors, and/or products to use in the manufacturing and production process.

9. The computer-implemented method of claim 1, wherein the manufacturing and production process interfaces have data reviews that provide a means for inputting signatures that are compliant with associated regulations.

10. The computer-implemented method of claim 1, wherein a dependency identifier receives one or more inputs defining dependencies between different manufacturing and production process steps.

11. A computer system for instantiating a software code building interface comprising:
   one or more processors; and
   one or more computer-readable media having stored thereon executable instructions that when executed by the one or more processors configure the computer system to perform at least the following:
      generate one or more reusable global software code elements comprising data structures that are implemented to dynamically create interactive interfaces that present and allow interaction with discrete steps of a manufacturing and production process;

generate multiple interactive manufacturing and production process interfaces, the multiple interactive manufacturing and production process interfaces indicating, based upon average times for batch records, whether a given task is behind or ahead of schedule; and after receiving software code updates, identify the one or more reusable global software code elements that are affected by the software code updates, wherein:

the one or more reusable global software code elements are implemented within the multiple interactive manufacturing and production process interfaces, and after the one or more reusable global software code elements that need to be updated are identified, the identified one or more reusable global software code elements are automatically updated, such that the multiple interactive manufacturing and production process interfaces are also automatically updated.

12. The computer system of claim 11, wherein the discrete steps of the manufacturing and production process include unit procedures, operations, and sections in which operators interact with the interactive interfaces.

13. The computer system of claim 11, wherein the one or more reusable global software code elements comprise library elements that provide features that are reusable in different interactive interfaces.

14. The computer system of claim 13, wherein the executable instructions include instructions that are executable to configure the computer system to:

determining that at least one of the library elements has been updated; and marking at least one updated library element with an identifying mark, such that other software code elements that use the at least one of the library elements will use the at least one updated library element.

15. The computer system of claim 11, wherein interactive interfaces that have dependencies or parallel processes are marked in a specified manner.

16. The computer system of claim 11, wherein the one or more reusable global software code elements are modular, independent units that are reusable in a plurality of interactive interfaces for different manufacturing and production processes.

17. The computer system of claim 16, wherein properties are implemented across modules, data types, and forms, allowing change control in the manufacturing and production process.

18. The computer system of claim 17, wherein the properties identify which groups, supervisors, and/or products to use in the manufacturing and production process.

19. The computer system of claim 11, wherein the manufacturing and production process interactive interfaces have data reviews that provide a means for inputting signatures that are compliant with associated regulations.

20. A computer-readable media comprising one or more physical computer-readable storage media having stored thereon computer-executable instructions that, when executed at a processor, cause a computer system to:

generate one or more reusable global software code elements comprising data structures that are implemented to dynamically create interactive interfaces that present and allow interaction with discrete steps of a manufacturing and production process;

generate multiple interactive manufacturing and production process interfaces, the multiple interactive manufacturing and production process interfaces indicating, based upon average times for batch records, whether a given task is behind or ahead of schedule; and after receiving software code updates, identify the one or more reusable global software code elements that are affected by the software code updates, wherein:

the one or more reusable global software code elements are implemented within the multiple interactive manufacturing and production process interfaces, and after the one or more reusable global software code elements that need to be updated are identified, the identified one or more reusable global software code elements are automatically updated, such that the multiple interactive manufacturing and production process interfaces are also automatically updated.

* * * * *